United States Patent
Stein (10) Patent No.: US 11,146,485 B1
(45) Date of Patent: Oct. 12, 2021

(54) TIME SENSITIVE NETWORK PROGRAMMING

(71) Applicant: RAD DATA COMMUNICATIONS LTD., Tel Aviv (IL)

(72) Inventor: Yaakov Stein, Jerusalem (IL)

(73) Assignee: RAD Data Communications Ltd., Tel Aviv (IL)

( * ) Notice: Subject to any disclaimer, the term of this patent is extended or adjusted under 35 U.S.C. 154(b) by 0 days.

(21) Appl. No.: 17/181,550

(22) Filed: Feb. 22, 2021

(51) Int. Cl.
*H04L 12/721* (2013.01)
*H04L 12/725* (2013.01)
*H04L 12/741* (2013.01)
*H04L 12/717* (2013.01)

(52) U.S. Cl.
CPC .......... *H04L 45/566* (2013.01); *H04L 45/302* (2013.01); *H04L 45/42* (2013.01); *H04L 45/74* (2013.01)

(58) Field of Classification Search
None
See application file for complete search history.

(56) References Cited

U.S. PATENT DOCUMENTS

| | | | | |
|---|---|---|---|---|
| 6,791,992 | B1* | 9/2004 | Yun | H04L 47/564 370/415 |
| 10,862,944 | B1* | 12/2020 | Hegar | H04L 65/608 |
| 2015/0052283 | A1* | 2/2015 | Ishii | G06F 13/4282 710/309 |
| 2018/0034712 | A1* | 2/2018 | Nainar | H04L 41/5009 |
| 2019/0044857 | A1* | 2/2019 | Jereczek | H04L 45/02 |
| 2019/0045028 | A1* | 2/2019 | Wysocki | H04L 67/322 |

OTHER PUBLICATIONS

Matthew Andrews et al., Minimizing end-to-end delay in high-speed networks with a simple coordinated schedule; Journal of Algorithms 52, Apr. 15, 2004, pp. 57-81.
N. Finn, Deterministic Networking Problem Statement; Huawei Technologies Co. Ltd, Internet Engineering Task Force (IETF); May 2019, pp. 1-11.
C. Filsfils et al., Segment Routing Architecture; Internet Engineering Task Force (IETF); Jul. 2018, pp. 1-19; URL: https://datatracker.ietf.org/doc/rfc8402/?include_text=1.
Norman Finn, Introduction to Time-Sensitive Networking; IFFF Communications Standards Magazine, Jun. 2018, pp. 22-28.

\* cited by examiner

*Primary Examiner* — Yaotang Wang
(74) *Attorney, Agent, or Firm* — A. C. Entis-IP Ltd.; Allan C. Entis (57) ABSTRACT

Provided herein is a method for a router to process time-sensitive packets, the method comprising: receiving a time-sensitive packet comprising a stack containing at least one local deadline, the stack being comprised within a header of the time-sensitive packet; retrieving a local deadline from the at least one local deadline comprised within the header; and scheduling transmission of the time-sensitive packet based on the local deadline. Also provided is a method for a router to process time-sensitive packets, the method comprising: receiving a time-sensitive packet comprising a stack containing at least one entry, each entry of the at least one entry respectively comprising, as sub-entries, a forwarding instruction and a local deadline; retrieving an entry from the stack; forwarding the time-sensitive packet according to the forwarding instruction comprised in the retrieved entry; and scheduling transmission of the time-sensitive packet based on the local deadline comprised in the retrieved entry.

18 Claims, 8 Drawing Sheets

TIME SENSITIVE NETWORK PROGRAMMING

FIELD

The present disclosure relates to a packet forwarding mechanism for time sensitive networking. More specifically, it relates usage of network programming techniques to reduce end-to-end propagation latency.

BACKGROUND

Packet-switched networks, such as those based on IP, MPLS, and Ethernet, have become the dominant means for transferring information, because their statistical multiplexing of packets allows them to attain high efficiency with low management overhead. The drawback of this statistical multiplexing is that end-to-end propagation latency is significantly higher than the minimum physically possible, since packets need to reside in queues waiting for their turn to be output.

Figure 1:
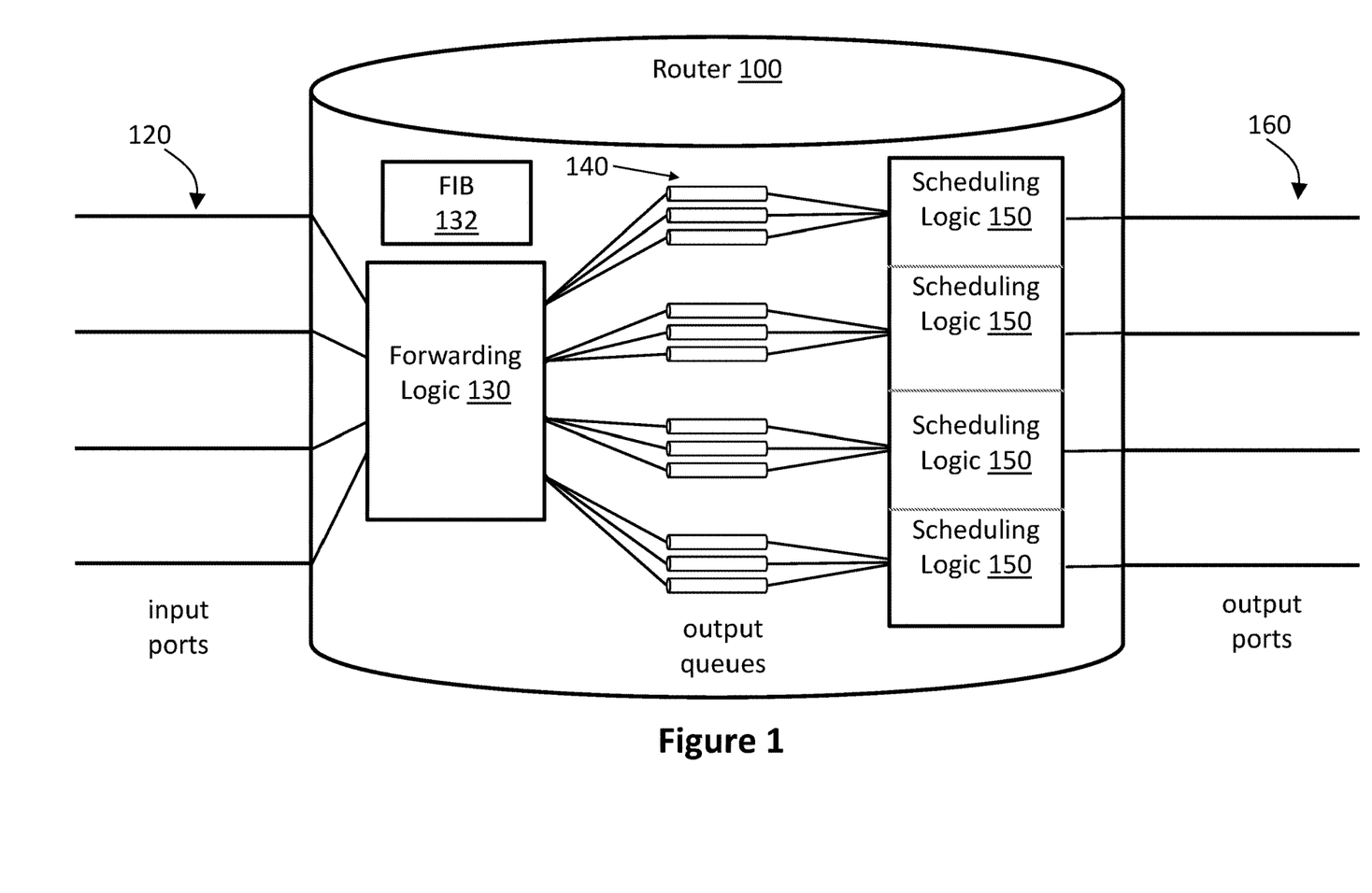
FIG. 1 schematically shows an example of a prior art router.

For convenience of disclosure, the term "router" as used herein refers to any device that forwards packets in a packet switched network. Thus, an Ethernet bridge or switch in an Ethernet network, an MPLS Label Switched Router (LSR) in an MPLS network, and an IP router in an IPv4 or IPv6 network, may be referred to herein as "routers". Reference is made to FIG. 1 that shows a prior art router 100. The router comprises input ports 120 fed into forwarding logic 130 that makes forwarding decisions assigning each incoming packet to a particular output port 160 and a particular output queue 140 belonging to that output port. The scheduling logic 150 decides, for each output port 160, from which output queue 140 a packet will be transmitted.

Routers perform two distinct functions on incoming packets: forwarding and scheduling. Forwarding decides where to send each packet, and scheduling decides when to send each packet. Forwarding, performed by forwarding logic 130, comprises obtaining the incoming packet from an input port 120, examining the packet's headers, deciding on an output port 160 and a specific output queue 140 belonging to this output port based on the header information and a forwarding information base (FIB) 132 stored in or otherwise accessible to forwarding logic 130, and placing the packet into the selected output queue 140. The router may, in addition, edit the packet header (for example in IP decrementing the TTL field, in MPLS performing a stack operation on the MPLS stack). For convenience of presentation, a collection of packets from a same source and intended for a same destination, for which all the forwarding decisions are desired to be identical, may be referred to as "packet flow" or "flow". Scheduling, performed by scheduling logic 150 for a given output port 160, consists of selecting which output queue 140 and which packet from that output queue will be the next packet to be physically transmitted over output port 160.

Routers may additionally participate in "routing protocols" by exchanging information with other routers, in order to maintain and update as needed the FIB. Alternatively, a Network Management System (NMS) or a Software Defined Networking (SDN) controller may be used to directly configure the forwarding information base of the routers from a central location.

A variant of SDN is "Segment Routing" (SR), which has been proposed for MPLS and IPv6 networks. In Segment Routing, a set of forwarding instructions are placed in the packet header. By way of example, each forwarding instruction may be an IPv6 address of the next router in an IPv6 network or an MPLS label of the next link in an MPLS network. The set of forwarding instructions placed in the packet header is structured in the form of a "stack", a data structure that exposes a single element at a time (known as the Top of Stack or "ToS"). Each router in turn inspects the forwarding information exposed at the ToS, removes ("pops") that forwarding information, and exposes a new ToS comprising a new forwarding information to be inspected by the next router. The forwarding instructions thus form a first-in first-out stack dictating respective forwarding decisions of successive routers. SR obviates the arduous task of updating all routers to know how to forward all packets.

Many modern applications of network communications require very low latency. Examples of such applications include real-time interactive applications such as video conferencing and gaming; electric utility operational networks responsible for transport of phase information for grid performance monitoring or to support distributed generation; Industry 4.0 communications between cooperating robots; combining video streams from different cameras; smart city and Internet of Things. For these reasons, the next generation of cellular networks (denoted 5G) defines Low Latency Communications as a class by itself.

Recently a group of technologies has been developed for transporting time sensitive packet traffic, that is, packets that are required to be delivered to their final destination by a given time. For Ethernet networks these technologies are collectively referred to as Time Sensitive Networking (TSN), while for IP and MPLS networks a closely related set of technologies is referred to as Deterministic Networking (DetNet). For convenience of presentation, "TSN" unless otherwise specified refers to both TSN and DetNet. A feature of TSN-based networks is that all of their forwarding elements (Ethernet switches, MPLS Label Switched Routers, or IP routers—any of which may be referred to herein as "routers") are time-synchronized.

Unlike conventional strict priority or Weighted Fair Queueing scheduling algorithms, TSN scheduling algorithms may reduce queueing latency by directly utilizing the current time of day. A method that may be employed in TSN-based networks is time-aware scheduling (alternatively referred to as time-aware gating). In time-aware scheduling, a router reserves recurring time-windows of predetermined duration for transmission of time sensitive packets belonging to particular flows. By appropriately configuring these time-windows in all routers, packets in time sensitive flows may be able to traverse their end-to-end path without ever needlessly waiting in output queues. In fact, time-aware gating may be able to provide a guaranteed upper bound for end-to-end delay.

A drawback of time-sensitive scheduling is that a time duration is reserved even if there are very few packets of the corresponding type. This disadvantage detracts from the efficiency advantage provided by statistical multiplexing that made packet switched networks popular in the first place. Minimizing time durations increases efficiency, but at the cost of obliging a time sensitive packet that just missed its gate to wait until its next opportunity, endangering conforming to the delay budget.

Furthermore, while in theory it is possible to gather as inputs the expected transmission times of all time sensitive packets, the propagation latencies of all links between routers, and the loading of all routers, and then calculate optimal gating schedules for all routers in the network based on those inputs, and finally distribute the calculated optimal gating schedules to all the routers. However, conducting such a calculation is computationally expensive and updating all the routers is communicationally expensive. Moreover, admitting a new time-sensitive flow would require recalculation of all the gating schedules and updating all the routers. This recalculation and communications load would be practical only for small networks and a relatively small numbers of flows, and thus not practical for modern communications networks currently in use.

For convenience of presentation, a time that a packet is sent by the end user application or the time it enters a specific network may be referred to herein as the "birth time", the required delivery time to the end-user application (or the time it exists a specific network) may be referred to as the "final deadline" and a difference between birth time and the final deadline, which quantifies the maximally allowed end-to-end propagation time though the network, may be referred to as the "delay budget".

SUMMARY

An aspect of the disclosure relates to an improved packet forwarding method and related apparatuses that provides low end-to-end propagation latency for time sensitive packets without the above-noted disadvantages of current TSN mechanisms.

An aspect of the disclosure relates to a packet transmitter that is configured to insert a plurality of deadlines into a header of a packet, by way of example a time-sensitive packet. The deadlines may be arranged within the header as a stack data structure, that is, a data structure in which only the top element is available for use, and in which this top element may be removed ("popped") in order to expose the next element. In an embodiment of the disclosure, the count of deadlines in the stack (which may be referred to herein as a "deadline stack") equals the count of a plurality of routers the packet is expected to traverse in the network, and each deadline corresponds respectively to a specific router of the plurality of routers that is expected to be traversed by the time-sensitive packet. For convenience of presentation, a time-sensitive packet having a header comprising a plurality of deadlines in accordance with an embodiment of the disclosure may be referred to herein as a deadline-annotated ("DA") packet.

A deadline stack may be inserted into the DA packet by the user equipment that is the source of the packet, or by the ingress router to a network. In the former case, the ToS deadline corresponds to the time by which the packet should exit the ingress router, while in the latter the ToS deadline corresponds to the time by which the packet should exit the second router it encounters.

A router in accordance with an embodiment of the disclosure, which is configured to retrieve a deadline from the deadline stack of a DA packet traversing therethrough and control scheduling of the DA packet responsive to the retrieved deadline, may be referred to herein as a deadline-sensitive ("DS") router.

A DS router may be configured to retrieve from the deadline stack the deadline that corresponds to itself. In some embodiments the stack is dynamic and at all times the relevant deadline is at the top of stack. In such embodiments each DS router may be configured to pop the top of deadline stack, simultaneously retrieving its deadline and removing it from the packet headers. In other embodiments the deadline stack may be static and comprise an index. In such embodiments each DS router may be configured read the time value indexed by the current index, and increment said index.

In embodiments of the disclosure, the DS router is configured to interpret the retrieved deadline as a time by which the DA packet should exit the DS router, and to forward the DA packet to the next DS router at or before this time.

In an embodiment of the disclosure, the deadline stack may be determined based on a delay budget, known link propagation latencies, and information relating to the individual routers.

In an embodiment of the present disclosure, packets may additionally be prioritized with priority levels specified in the packet headers. There may be several levels of priority of time sensitive packets, and in addition packets that are not time sensitive competing for the same network resources. For example, there may be Best Effort (BE) packets with no specific Quality of Service (QoS) requirements.

In an embodiment of the present disclosure, the deadline stack, in addition to the deadlines, additionally comprises forwarding instructions. In such an embodiment, each entry of the deadline stack fully prescribes the forwarding behavior of the corresponding router, both to-where and by-when the packet should be forwarded. For example, each stack may contain the address of the next hop and the deadline by which the packet must be forwarded to that address. In one such embodiment the combined stack is inserted by the source user equipment. In another such embodiment the combined stack is inserted by the ingress router to the network. It will be appreciated that, in an embodiment in which the deadline stack comprises both to-where and by-when information, the present invention fully implements network programming for time sensitive application flows.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature.

DETAILED DESCRIPTION

Figure 2A:
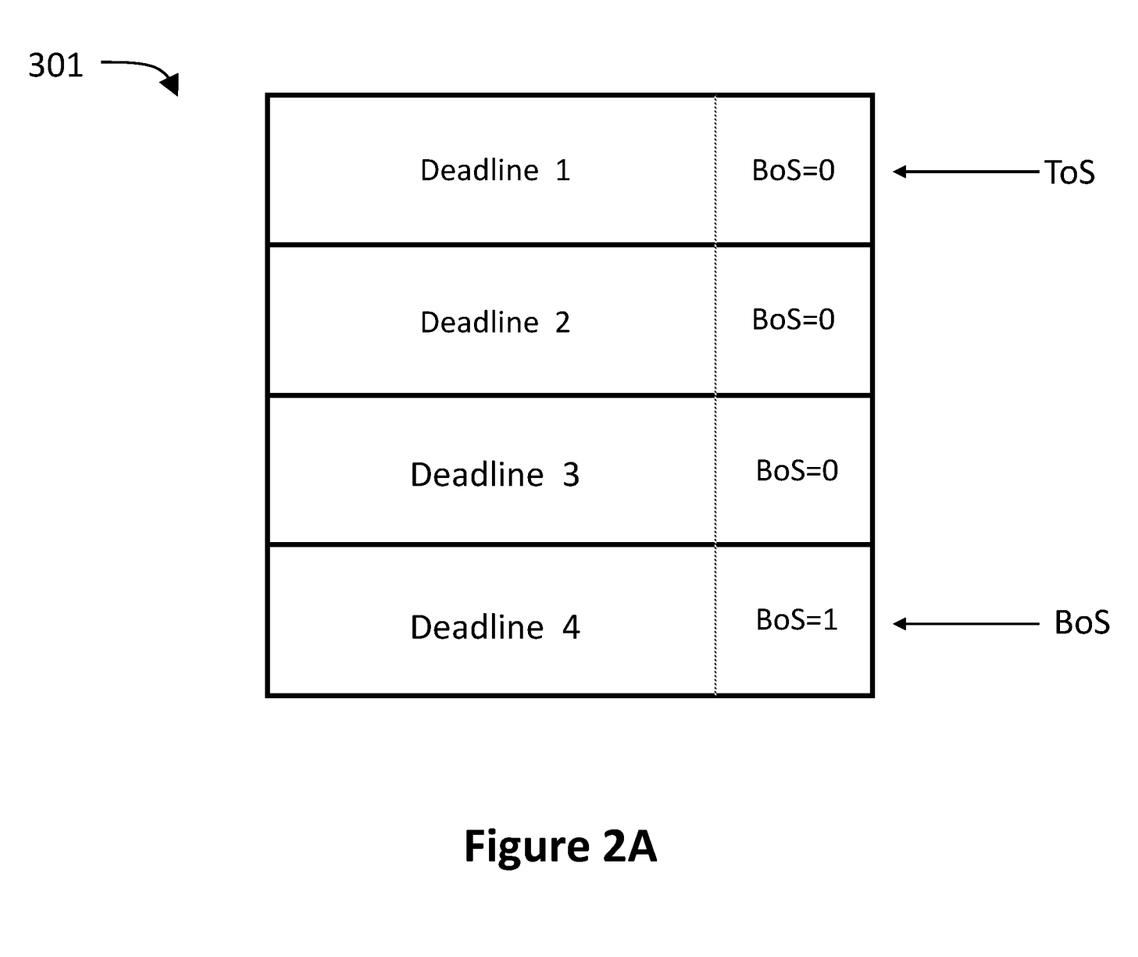
FIG. 2A schematically shows a DS router in accordance with an embodiment of the disclosure.

Reference is made to FIG. 2A, which schematically shows a deadline stack 301 comprised in a header of a DA packet in accordance with an embodiment of the disclosure. Deadline stack 301 may comprise a plurality of deadlines, one deadline for each router that the DA packet is expected to traverse between the point the stack is inserted and destination. As shown in the figure, deadline stack 301 comprises deadlines D(1) through D(4) for each of four DS routers that the DA packet comprising deadline stack 301 is expected to traverse (by way of example DS routers 201, 202, 203 and 204 schematically shown in FIG. 3). The deadline stack may be structured as a stack of entries, in which only one entry designated as the ToS entry is available to be retrieved by a router at any one time, and retrieval of one entry exposes the next entry as the ToS entry for subsequent retrieval. As a result of the sequential exposure of the entries of deadline stack 301 at each DS router traversed by the DA packet, deadline stack 301 is structured so that the first router may retrieve deadline 1, the second router may retrieve deadline 2, the third router may retrieve deadline 3, and the last router may retrieve deadline 4. Deadline stack 301 may be, as shown in FIG. 2A, a dynamic stack so that at all times the relevant deadline is at the ToS. In such a case, the DS router may be configured to pop the top of deadline stack, simultaneously retrieving its deadline and removing it from the packet header. Alternatively, the deadline stack may be static and comprise an index, in which case the DS router may be configured to read the deadline indexed by the current index, and increment said index so that the next deadline is read by the subsequent DS router.

Figure 2B:
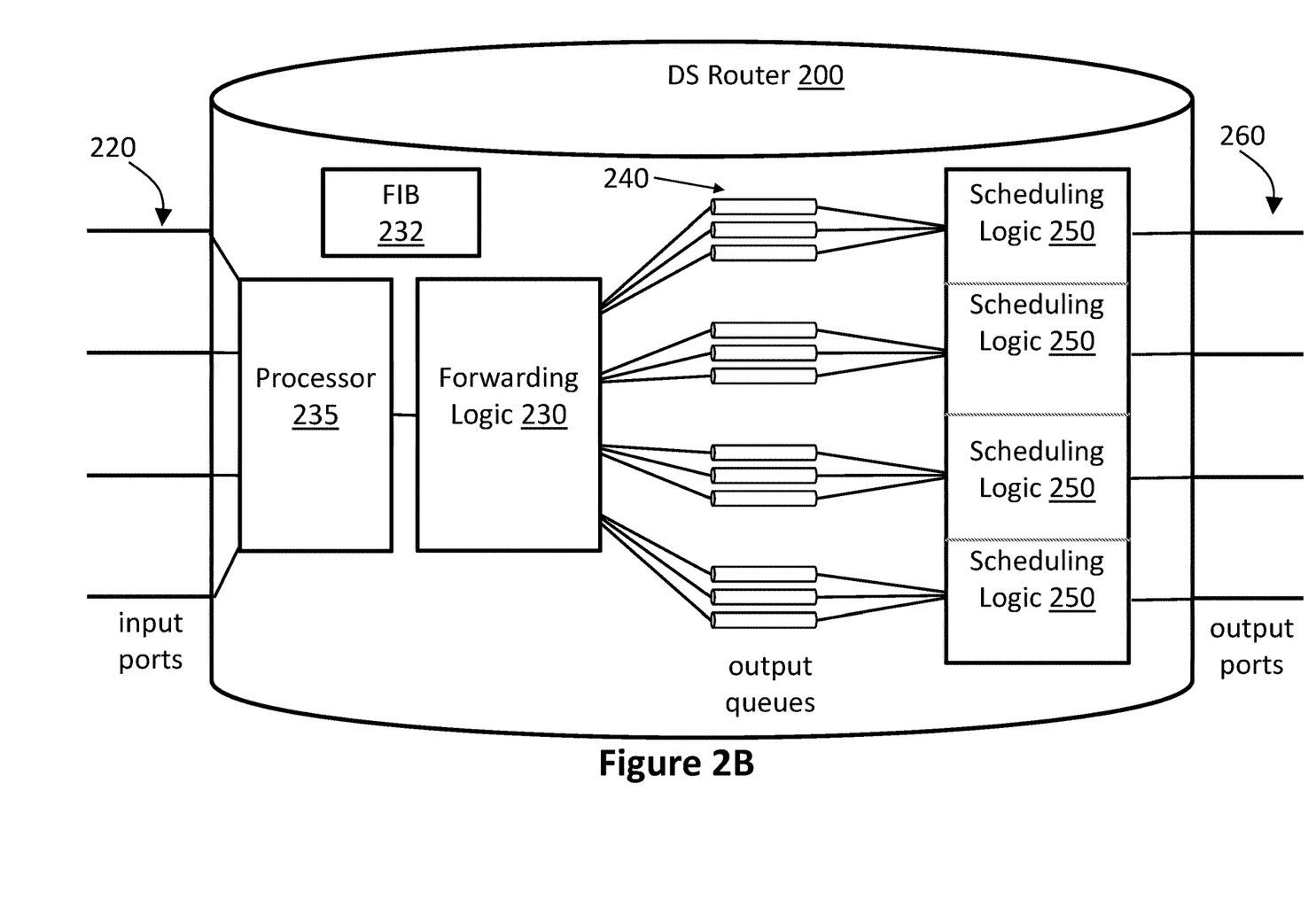
FIG. 2B schematically shows a deadline stack in accordance with an embodiment of the disclosure.

Reference is made to FIG. 2B that schematically shows a DS router 200 in accordance with an embodiment of the disclosure. The DS router comprises input ports 220 fed into a deadline stack processor 235 that, responsive to a set of instructions stored in a memory, is configured to process a deadline stack of an incoming DA packet and retrieve a deadline comprised in the ToS entry (by way example deadline stack 301).

Forwarding, performed by forwarding logic 230, comprises deciding on an output port 260 and a specific output queue 240 belonging to this output port based on information comprised in the header of the DA packet and optionally a FIB 232, and placing the packet into the selected output queue 240. Scheduling, performed by scheduling logic 250 for a given output port 260, consists of selecting which output queue 240 and which packet from that output queue will be the next packet to be physically transmitted over output port 260. In accordance with an embodiment of the disclosure, scheduling logic 250 is configured to schedule transmission of the DA packet responsive to the retrieved deadline. Optionally, the scheduling logic is configured to forward time-sensitive packets, including the DA packet, in ascending order of their respective deadlines, in a policy that may be referred to herein as Earliest Deadline First (EDF).

Figure 3:
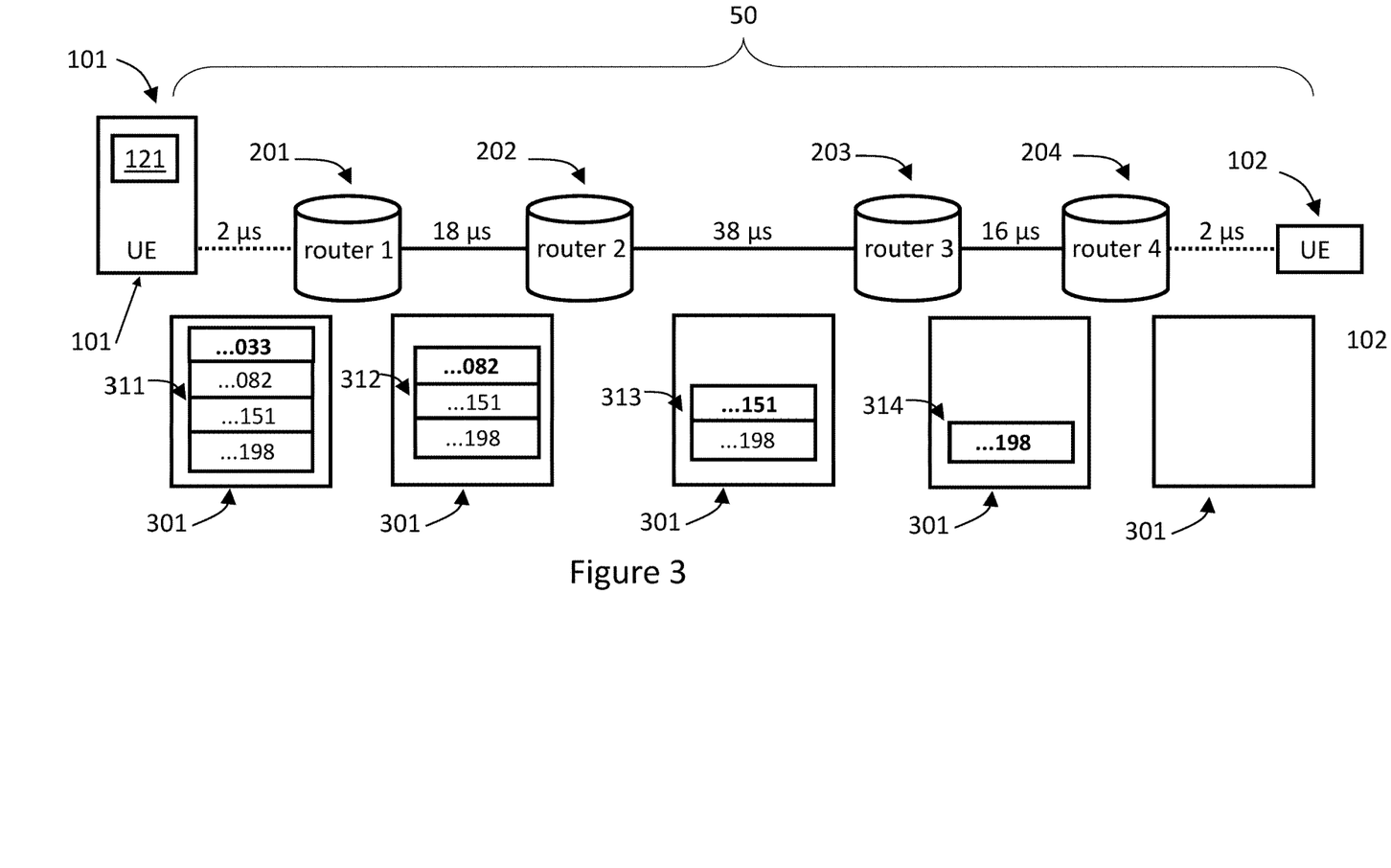
FIG. 3 schematically shows transmission of a DA packet comprising a deadline stack through a packet-based network comprising DS routers, in accordance with an embodiment of the disclosure.

Reference is made to FIG. 3, which schematically shows an example end-to-end path traversed from a source User Equipment (UE) 101 to a destination UE 102 by a DA packet. Between source UE 101 and destination UE 102, the DA packet travels through wireless links (schematically indicated by dotted lines) and wireline links (schematically indicated by solid lines), traversing DS routers 201, 202, 203, 204 in order to reach a destination User Equipment 102. Each DS router, which may be configured in accordance with DS router 200 depicted in FIG. 2B, may be configured to retrieve a ToS deadline from a deadline stack comprised in DA packets. In addition, the local clocks (not shown) comprised in each DS router respectively, and optionally the local clocks comprised respectively in each of in UE 101 and UE 102, are synchronized. The synchronization of the respective local clocks may be synchronized to within better than 1 microsecond.

In an embodiment of the disclosure, propagation latency of each link along the packet's path is known. By way of example, an application being run on destination UE 102 require a time-sensitive packet flow characterized by a maximum delay of 200 microseconds between packets being transmitted by source UE 101 and being received by destination UE 102. Packets transmitted from UE 101 traversing the wireless link reaches DS router 201 (the ingress router) with a physical propagation time of 2 microseconds. The packets then travel from DS router 201 to DS router 202 over an optical fiber experiencing a physical propagation time of 18 microseconds, then travel from DS router 202 to DS router 203 experiencing an additional 38 microseconds of physical propagation time, then travel from DS router 203 to DS router 204 (the egress router) experiencing 16 microseconds of physical propagation time, and finally travel from DS router 204 to destination UE 102 through a wireless link experiencing a physical propagation time of 2 microseconds. Thus, the total constant physical propagation time is 2+18+38+16+2=76 microseconds. Moreover, it may be assumed by way of example that each DS router requires 1 microsecond to receive the packet and 5 microseconds to process and forward the packet. Given that the end-to-end path include four DS routers, the receiving and processing times add another 24 microseconds (6 microseconds per router×4 routers) to the propagation time. Therefore, the minimum travel time for a DA packet to traverse the network between source UE 101 and destination UE 102 is 100 microseconds (76 microseconds+24 microseconds).

Due to the application having a delay budget of 200 microseconds, a DA packet traversing the network may wait in router output queues an additional 100 microseconds (200 microseconds—100 microseconds) and still conform to the overall delay budget. The spare 100 microseconds may be divided equally among the four routers, i.e., 25 microseconds per router in order to calculate a deadline for each of DS router. Alternatively, the total delay allowance may be divided unequally between each of the DS routers, based, for example, on port rates, router specifications, or router loading. By way of example, DS routers that tend to experience higher traffic may be assigned a longer delay allowance compare to other DS routers.

As shown in FIG. 3, source UE 101 comprises a deadline generator 121 configured to insert a deadline stack into time-sensitive packets to generate a DA packet. In an embodiment of the disclosure, a deadline offset vector is precalculated and used along with the packet birth time to obtain the deadlines in the deadline stack. By way of example, assuming that the deadline offset vector is (in microseconds) [33, 82, 151, 198], and the packet birth time (in hours:minutes:seconds.milliseconds.microseconds) is 10:11:12.000.000, then the deadline stack to be inserted into the packet would be comprise the times 10:11:12.000.033 (ToS), 10:11:12.000.082, 10:11:12.000.151, and 10:11:12.000.198 (BoS).

In an embodiment, a deadline offset vector comprising deadlines D(i) may be calculated based on the physical propagation latencies for all links comprising the end-to-end path (we shall denote by P(i) the latency for the link feeding router i), the overhead time taken by router i to receive and process the packet (which we shall denote O(i)), and the spare time allotted to router i (which we shall denote S(i)). We may calculate the deadlines recursively as D(i+1)=D(i)+O(i)+S(i), where we initialize the calculation with D(0)=0.

Continuing the previous example, the first deadline D(1)=0+2 (propagation latency)+6 (overhead)+25 (spare for queuing)=33 microseconds. Similarly, D(2)=33+18+6+25=82 microseconds; D(3)=82+38+6+25=151 microseconds; D(4)=151+16+6+25=198 microseconds. Since the final propagation latency is 2 microseconds, the packet will arrive after 200 microseconds in the worst case.

The present disclosure is not limited to the above-noted procedure for calculating a deadline vector, and other calculation procedures are contemplated, by way of example a randomized algorithm provided in Andrews, M. and L. Zhang, "Minimizing end-to-end delay in high-speed networks with a simple coordinated schedule", Journal of Algorithms 52 57-81, 2003.

The embodiment in which source UE 101 comprises a deadline generator 121 suffers from the disadvantage that the source UE must also be time synchronized for the time values of the deadlines comprised in the deadline stack to be directly compatible with the local times maintained by reach of the DS routers. Furthermore, it requires for the source UE to be intimately knowledgeable of network parameters (such as link propagation latencies and router specifications).

Figure 4:
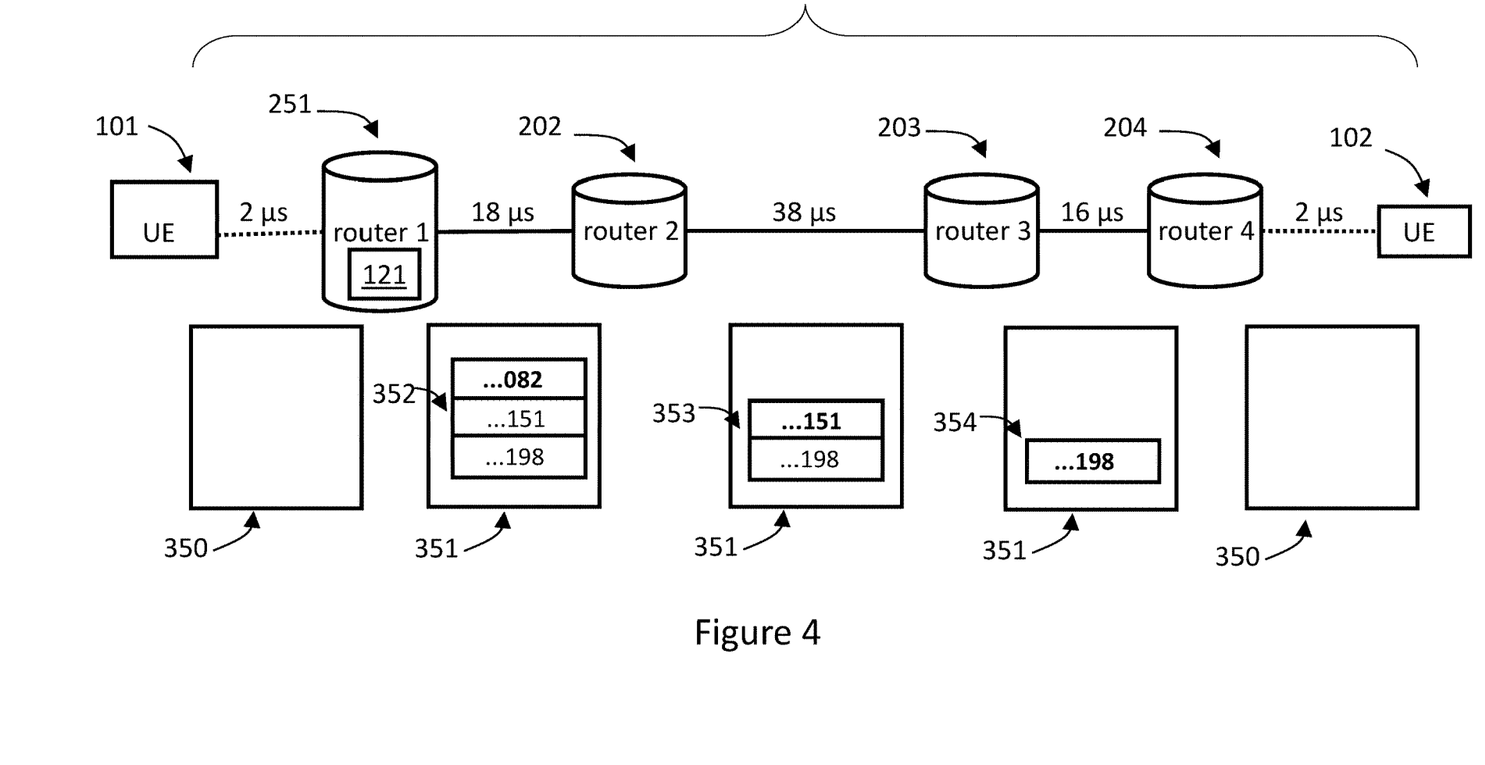
FIG. 4 schematically shows transmission of an alternative DA packet comprising a deadline stack through a packet-based network comprising DS routers, in accordance with an embodiment of the disclosure.

FIG. 4 schematically shows an embodiment in which the deadline stack is inserted into a time-sensitive packet by the ingress router to a network, rather than by the source UE. This ingress router-based method of DA packet generation is advantageous in that the deadlines will be in concert with time in the network, without needing to additionally synchronize the source UE to the network. In the case where the deadline stack is generated at the ingress router, a first deadline for the ingress router will not explicitly appear in the deadline stack and the ToS of the deadline stack corresponds to the second DS router in the network to be traversed by the packet. Hence, continuing the previous example, the deadline stack will comprise the times 10:11:12.000.082 (ToS), 10:11:12.000.151, and 10:11:12.000.198 (BoS).

FIG. 3 schematically shows the transmission of a DA packet 301 comprising one or more of deadlines D(1) through D(4) as calculated above. DA packet 301, when generated in and transmitted from source UE 101, comprises a deadline stack 311 comprising four deadlines, one for each of Routers 1-4, with Deadline 1 having a time of 10:11:12.000.033 being the ToS designated to be recovered by Router 1.

For convenience of presentation, deadlines in deadline stack 311 (as well as subsequent deadline stack shown in FIG. 3) are shown in an abbreviated form with only the microsecond unit. Thus, by way of example, deadline D(1) having a time of 10:11:12.000.033 is shown in FIG. 3 as " . . . 033". Also, for convenience of presentation, the ToS deadline in each deadline stack shown in FIG. 3 is placed at the top level and indicated in bold. Therefore, in deadline stack 311, deadline D(1) of " . . . 033" is placed at the top level and bolded.

When DA 301 comprising deadline stack 311 is received by DS router 201, which is the ingress router, DS router 201 pops the ToS deadline and retrieves deadline D(1) of 10:11:12.000.033. Each DS router is configured to ensure that a DA packet is scheduled by the scheduling logic to forward the packet at or before by the ToS Deadline. Thus, DS router 201 is configured to schedule DA packet 301 responsive to the retrieved deadline (D(1)) so that DA 301 is forwarded at or before 10:11:12.000.033.

Due to the ToS deadline of deadline stack 311 being popped at DS router 201, DA packet 301 forwarded by DS router 201 to DS router 202 comprises a reduced deadline stack 312 comprising deadlines D(2) through D(4), with deadline D(2) of 10:11:12.000.082 (indicated as " . . . 082" in FIG. 3) being the ToS deadline. DS router 202, upon receiving DA packet 301, pops the ToS deadline and retrieves deadline D(2) of 10:11:12.000.082, schedules DA packet 301 to be forwarded at or before 10:11:12.000.082, and forwards the DA packet comprising a further reduced deadline stack 313 comprising deadline D(3) and deadline D(4), with deadline D(3) of 10:11:12.000.151 being the ToS deadline. This process is repeated through DS router 203 and DS router 204. Thus, DS router 203 schedules DA packet 301 to be forwarded at or before deadline D(3) (10:11:12.000.151) and DS router 204 schedules DA packet 301 to be forwarded at or before deadline D(4) (10:11:12.000.198). Once DA packet 301 is forwarded from DS router 204 towards destination UE 102, all of the deadlines have been popped off the stack so that the DA packet no longer comprises a deadline stack.

Reference is now made to FIG. 4, which schematically shows an embodiment of the disclosure wherein deadline generator 121 is located in ingress router 251 such that a deadline stack 352 is generated and inserted into the header of a time-sensitive packet 350 to generate a DA packet 351 at ingress router 251, for transmission to and use in DS routers 202, 203 and 204 in accordance with a router-based deadline calculation. In an efficient implementation a deadline offset vector is precalculated for each time-sensitive flow and used to along with the packet birth time to obtain the deadlines in the deadline stack. It will be appreciated that the ingress router may store a plurality of offset vectors, each offset vector being reserved for use in a different time-sensitive flow.

Referring to FIG. 4, let there be a time-sensitive packet 350 that was transmitted from UE 101 at birth time 10:11:12.000.000. Ingress router 251 is configured to select an appropriate offset vector based on information contained in the header of time-sensitive packet 350. Continuing the previous example, for time-sensitive packet 350, ingress DS router 251 selects deadline offset vector [33, 82, 151, 198] and calculates deadlines for a deadline stack 352 as before. The first deadline it uses in its own scheduling process, so that DA 351 is forwarded at or before 10:11:12.000.033.

Deadline stack 352 is built from the remaining three deadlines, deadline D(2) being the ToS, followed by deadlines D(3) and D(4). DS router 202, upon receiving DA packet 351, pops the ToS deadline and retrieves deadline D(2) of 10:11:12.000.082, schedules DA packet 351 to be forwarded at or before this time, and forwards the DA packet comprising a further reduced deadline stack 353 comprising deadline D(3) and deadline D(4), with deadline D(3) of 10:11:12.000.151 being the ToS deadline. This process is repeated through DS router 203 and DS router 204. Thus, DS router 203 schedules DA packet 351 to be forwarded at or before deadline D(3) of 10:11:12.000.151 and DS router 204 schedules DA packet 351 to be forwarded at or before deadline D(4) (10:11:12.000.198). Once DA packet 351 is forwarded from DS router 204 towards destination UE 102, all of the deadlines have been popped off the stack so that the DA packet no longer comprises a deadline stack and reverts to being time-sensitive packet 350.

A number of different time formats are in common use in networking applications and can be used to encode the local deadlines. The longest commonly utilized format is the PTP-80 timestamp defined in IEEE 1588v2 Precision Time Protocol. It consists of 80 bits, of which 48 are whole seconds and the remaining 32 are nanoseconds (from 0 to 1 billion). There are two common 64-bit time representations: the NTP-64 timestamp defined in IETF RFC 5905 Network Time Protocol, (32 bits for whole seconds and 32 bits for fractional seconds with resolution $2^{-32}$ seconds or about 233 picoseconds); and the PTP-64 timestamp (32 bits for whole seconds and 32 bits for nanoseconds), both of which wrap around after $2^{32}$ seconds or about 136 years. Finally, there is the NTP-32 timestamp, (16 bits of whole seconds and 16 bits of fractional seconds with resolution $2^{-16}$ seconds or over 15 microseconds and wraparound time of $2^{-16}$ seconds or about 18 hours). This last timestamp's resolution is less precise than 1 microsecond requirement, and thus will most often be unsuitable. However, the particular time format employed in the present disclosure need not be constrained by the above-noted common formats because wraparound requirements are minimal. As long as there is no ambiguity in times during the flight of a packet, which is typically substantially less than a second, the timestamp is acceptable. Thus, a non-standard 32-bit timestamp format with, by way of example, 12 bits of seconds (wraparound over 1 hour) and 20 bits for microseconds, or by way of example 8 bits for whole seconds (wraparound over 4 minutes) and 24 bits of tenths of microseconds may be used.

While a stack data structure is used to hold the deadlines in the DA packet header, other data structures may be used by the routers themselves to hold the time sensitive packets from the various flows. The standard data structure used in routers is the queue which, being a first in first out memory, is suitable for a policy of first-to-arrive first-to-exit, and not for EDF. Alternative router data structures suited for EDF are sorted lists, search trees, and heaps. If all the time sensitive flows are of the same priority, then a single data structure is used for all time sensitive flows.

The examples presented in FIGS. 3 and 4 are with respect to a single time-sensitive flow. However, a given network may support a plurality of different time-sensitive flows, and also flows that are not time sensitive, such as Best Effort flows. If the networks support time-sensitive flows of different priorities, then a separate router data structure should be used for each level of priority. By way of example, there may be two different priorities of time sensitive flows and a lower priority for Best Effort traffic that is not time sensitive, and a strict priority policy. In such a case, the scheduling logic of a DS router first check if the data structure for the highest priority contains any packets. If yes, the DS router transmits the packet with the earliest local deadline. If not, the DS router checks the queue for the second priority. If the second priority queue contains any packets, the DS router transmits the packet within the second priority queue with the earliest deadline. If not, the DS router checks the Best Effort queue, and if the Best Effort queue is nonempty the DS router transmits the next packet in the queue, i.e., the packet that has waited in the Best Effort queue the longest.

Optionally, a DS router in accordance with the disclosure employs strategies other than separate prioritization and EDF. An alternative strategy would be for the scheduler to define a maximal packet transmission time MAXTT, that is the longest time it could take for a packet that has been selected by the scheduler for transmission to exit the router at the output port's line rate. For example, it the largest packet is 1500 bytes and the port supports 1 Gbps, then MAXTT would be about 12 microseconds. Instead of checking whether the data structure for the highest priority contains any packets at all, it could check whether the earliest packet's local deadline is earlier than MAXTT from the current time. If yes, the packet is transmitted, if not the next priority is checked in full knowledge that even if a maximal size packet is transmitted the scheduler will still be able to transmit the higher priority packet before its local deadline.

Both Segment Routing and the deadline stack described herein above utilize a stack data structure. Therefore, it is advantageous to combine their information into a single unified stack, which may be referred to herein as a "SR-TSN stack". Optionally, each entry in a SR-TSN stack contains two subentries to be used by the corresponding DS router: a forwarding instruction (by way of example an address of a next router or a label specifying a next link); and a deadline. Advantageously, each entry of a SR-TSN stack fully prescribes the forwarding behavior of the corresponding router, both to-where and by-when the packet should be forwarded. The insertion of a SR-TSN stack into the header of time-sensitive packets thus fully implements network programming for time sensitive flows.

Figure 5:
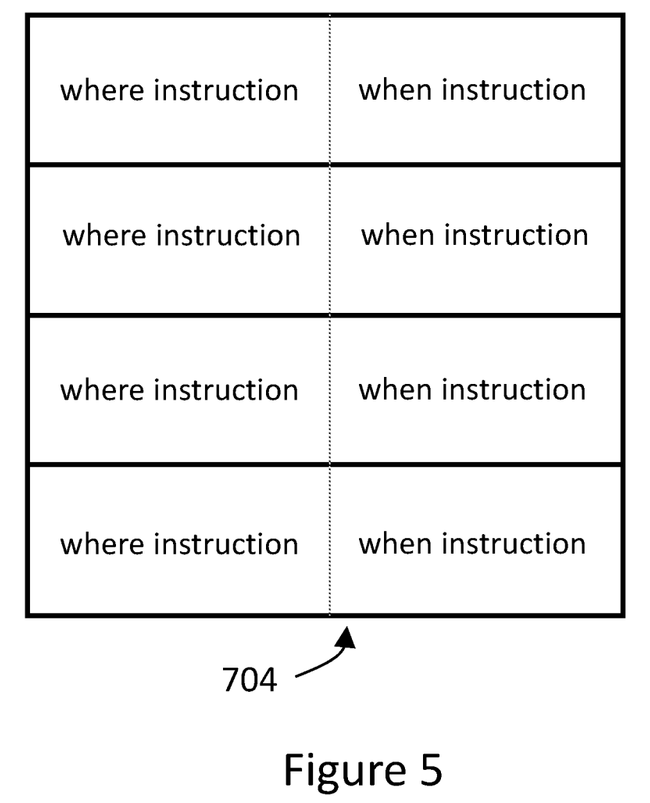
FIG. 5 schematically shows a SR-TSN stack in accordance with an embodiment of the disclosure.

SR-TSN stack 704 may be a dynamic stack so that at all times the relevant deadline is at the ToS. In such a case, the DS router may be configured to pop the top of SR-TSN stack, simultaneously retrieving its forwarding and scheduling instructions and removing it from the packet header. In such cases a BoS indication is required. Alternatively, the SR-TSN stack may be static and comprise an index, in which case the DS router may be configured to read the stack entry indexed by the current index, and increment said index so that the next SR-TSN entry is read by the subsequent DS router.

An example SR-TSN stack is schematically shown in FIG. 5. SR-TSN stack 704 may comprise a plurality of entries, one entry for each router that the time sensitive packet is expected to traverse between the point the stack is inserted and destination. As shown in the figure, each entry in SR-TSN stack 704 comprises a where instruction (by way of example an address of the next-hop router) and a when instruction (the corresponding deadline). Each router in turn pops the ToS retrieving the forwarding instruction and the scheduling instruction. In an embodiment the SR-TSN stack is inserted into the packet header by the source UE. In another embodiment the SR-TSN stack is inserted by an ingress router.

Figure 6:
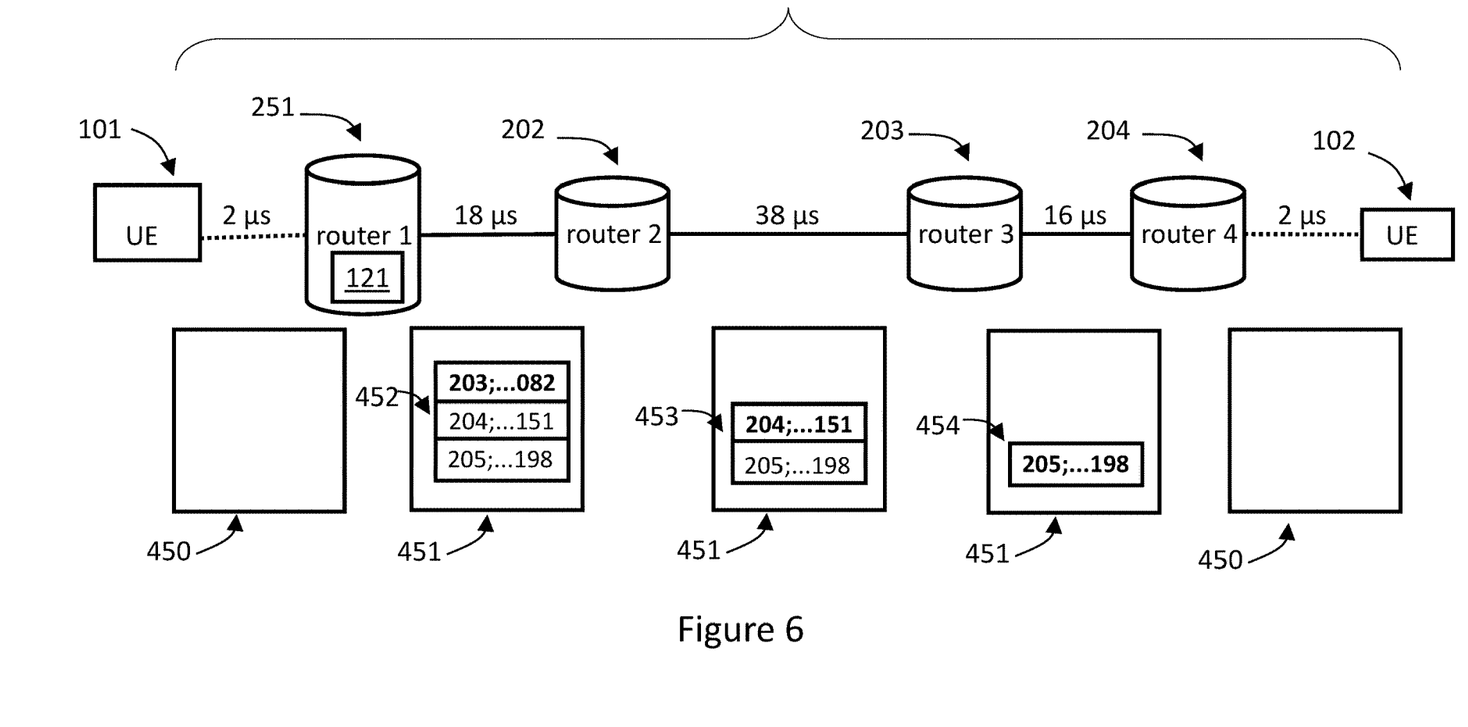
FIG. 6 schematically shows transmission of a DA packet comprising a SR-TSN stack through a packet-based network comprising DS routers, in accordance with an embodiment of the disclosure.

Reference is now made to FIG. 6, which schematically shows end-to-end path 52 between source UE 102 and destination UE 102 for an embodiment in which the SR-TSN stack is inserted by an ingress router. End-to-end path 52 is identical to end-to-end path 52 shown in FIG. 4 and deadline generator 121 is located in ingress router 251 such that a SR-TSN stack 452 is generated and inserted into the header of a time-sensitive packet 450 to generate a SR-TSN packet 451 at ingress router 251, for transmission to and use in DS routers 202, 203 and 204.

Ingress router 251 classifies the packet to a time-sensitive flow based on information in the packet headers. Based on this information, the ingress router looks up both the path to be taken by time-sensitive flow and its deadline offset vector, builds a set of local deadlines D(1) through D(4), and appends the SR-TSN stack comprising the router addresses for routers 202, 203, 204 and the corresponding deadlines D(2) through D(4). The ingress router then inserts the SR TSN stack into the packet header of time-sensitive packet 450 to generate SR-TSN packet 451 and schedules the packet to be transmitted before the time corresponding to the first local deadline (D1).

DS router 202, upon receiving DA packet 451, pops the ToS entry and retrieves the next-hop address 203 and deadline D(2) of 10:11:12.000.082. It forwards the packet with reduced SR-TSN stack comprising 2 entries to router 3, scheduling it to be forwarded at or before the deadline. This process is repeated through DS router 203 and DS router 204. Thus, DS router 203 forwards the packet with a single SR-TSN entry to address 204, scheduling it to be transmitted at or before deadline D(3) of 10:11:12.000.151. DS router 204 pops the final BoS SR-TSN entry, so that the DA packet no longer comprises a deadline stack and reverts to being time-sensitive packet 450, and forwards the time-sensitive packet according to the usual (non-SR-TSN) forwarding rules to UE 102 scheduling it to be transmitted at or before deadline D(4) (10:11:12.000.198).

Figure 7:
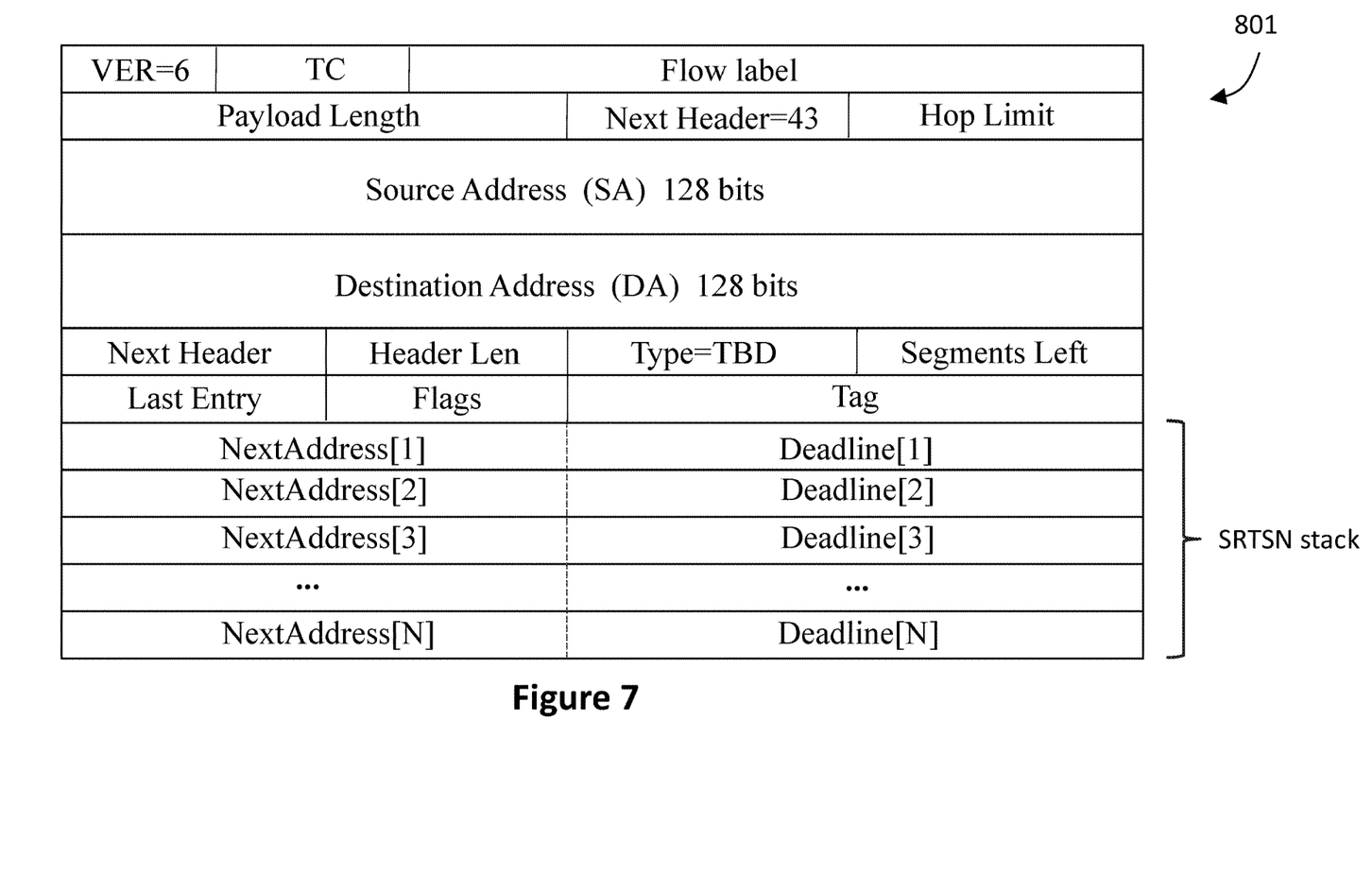
FIG. 7 schematically shown an example of a header of a DA packet comprising an SR-TSN stack in accordance with an embodiment of the disclosure.

Reference is now made to FIG. 7, which schematically shows an example of a header of a DA packet comprising an SR-TSN stack for use with IPv6. In this example the SR-TSN stack comprises an IPv6 routing extension header, as is used by SRv6. However, a different Type field is used in order to identify the stack as being an SR-TSN stack. Alternatively, the SR-TSN could comprise a different IPv6 extension header. In an IPv4 network the SR-TSN stack may comprise an IPv4 option header.

There is therefore provided in accordance with an embodiment of the disclosure a method for a router to process time-sensitive packets, the method comprising: receiving a time-sensitive packet comprising a stack containing at least one local deadline, the stack being comprised within a header of the time-sensitive packet; retrieving a local deadline from the at least one local deadline comprised within the header; and scheduling a transmission of the time-sensitive packet based on the local deadline.

In an embodiment of the disclosure, scheduling the transmission of the time-sensitive packet comprises ensuring that the time-sensitive packet is transmitted at or before the local deadline. Optionally, ensuring that the time-sensitive packet is transmitted at or before the local deadline comprises, from among a plurality of packets received by the router, transmitting a packet with an earlier local deadline before a packet with a later local deadline.

In an embodiment of the disclosure, retrieving the local deadline from the stack exposes a next deadline to be available for retrieval by a subsequent router.

There is therefore provided in accordance with an embodiment of the disclosure a method for a router to process time-sensitive packets, the method comprising: receiving a time-sensitive packet comprising a stack containing at least one entry, each entry of the at least one entry respectively comprising, as sub-entries, a forwarding instruction and a local deadline; retrieving an entry from the stack; forwarding the time-sensitive packet according to the forwarding instruction comprised in the retrieved entry; and scheduling transmission of the time-sensitive packet based on the local deadline comprised in the retrieved entry.

In an embodiment of the disclosure, scheduling transmission of the time-sensitive packet comprises ensuring that the time-sensitive packet is transmitted at or before the local deadline. Optionally, ensuring that the time-sensitive packet is transmitted at or before the local deadline comprises, from among a plurality of packets received by the router, transmitting a packet with an earlier local deadline before a packet with a later local deadline.

In an embodiment of the disclosure, retrieving the entry from the stack exposes a next entry to be available for retrieval by a subsequent router.

There is also provided in accordance with an embodiment of the disclosure a router configured to perform an embodiment of one of the above-noted methods for a router to process time-sensitive packets.

There is also provided in accordance with an embodiment of the disclosure a network comprising a plurality of routers, wherein each router is time-synchronized to the other routers and configured to perform an embodiment of one of the above-noted methods for a router to process time-sensitive packets.

There is also provided in accordance with an embodiment of the disclosure a method of specifying treatment of a packet by routers forwarding the packet through a packet-switched network, the method comprising inserting a stack structure into a header of the time-sensitive packet, wherein: the stack structure comprises a plurality of entries; each entry corresponds to a router the packet is to traverse; and each entry in the stack comprises a local deadline to be used by the corresponding router's scheduling logic. Optionally, each stack entry further comprises a forwarding instruction sub-entry to be used by the corresponding router's forwarding logic.

There is also provided in accordance with an embodiment of the disclosure a user equipment or an ingress router configured to perform the above-noted method of specifying treatment of a packet by routers forwarding the packet through a packet-switched network.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the invention is limited only by the claims.

The invention claimed is:

1. A method for a router to process time-sensitive packets comprised in a flow of packets, the method comprising:
   receiving a time-sensitive packet comprising a stack containing a plurality of entries, each entry having a predetermined local deadline relevant for a different router of a plurality of routers the packet is expected to traverse;
   retrieving a local deadline from a top-of-stack entry of the plurality of entries in the stack; and
   scheduling a transmission of the time-sensitive packet based on the retrieved local deadline.

2. The method according to claim 1, wherein scheduling the transmission of the time-sensitive packet comprises attempting to transmit the time-sensitive packet at or before the local deadline.

3. The method according to claim 2 wherein ensuring that the time-sensitive packet is transmitted at or before the local deadline comprises, from among a plurality of packets received by the router, transmitting a packet with an earlier local deadline before a packet with a later local deadline.

4. The method according to claim 1, wherein retrieving the local deadline from the stack comprises popping the top-of-stack entry.

5. A router configured to perform the method of claim 1.

6. A network comprising a plurality of routers, wherein each router of the plurality of routers is:
   time-synchronized to the other routers; and
   configured to perform the method of claim 1.

7. The method according to claim 1 wherein the top-of-stack entry additionally comprises a forwarding instruction and comprising retrieving the forwarding instruction from the top-of-stack entry and forwarding the time-sensitive packet according to the forwarding instruction.

8. The method according to claim 7, wherein scheduling transmission of the time-sensitive packet comprises attempting to transmit the time-sensitive packet at or before the local deadline.

9. The method according to claim 8 wherein ensuring that the time-sensitive packet is transmitted at or before the local deadline comprises, from among a plurality of packets received by the router, transmitting a packet with an earlier local deadline before a packet with a later local deadline.

10. A method according to claim 9 where each stack entry further comprises a forwarding instruction sub-entry to be used by the corresponding different router's forwarding logic.

11. The method according to claim 7, wherein retrieving the deadline or the forwarding instruction from the top-of-stack entry comprises popping the top-of-stack entry and exposing a next entry at the top of the stack.

12. A router configured to perform the method of claim 7.

13. A network comprising a plurality of routers, wherein each router of the plurality of routers is:
   time-synchronized to the other routers; and
   configured to perform the method of claim 7.

14. A method of specifying treatment of a time-sensitive packet by routers forwarding the packet through a packet-switched network, the method comprising inserting a stack structure into the time-sensitive packet, wherein:
   the stack structure comprises a plurality of entries;
   each entry corresponds to a different router the time-sensitive packet is to traverse; and
   each entry in the stack structure comprises a predetermined local deadline to be used by the corresponding different router's scheduling logic.

15. A user equipment configured to perform the method of claim 14.

16. An ingress router configured to perform the method of claim 14.

17. A communications network comprising a plurality of routers, each router configured to:
   receive for transmission in a flow through the plurality of routers a time sensitive packet, comprising a stack having a distinct stack entry for each of the plurality of routers, wherein the stack entry for a given router of the plurality of routers comprises a predetermined local deadline by which the given router is intended to transmit the packet; and
   retrieve the local deadline from a top-of-stack entry in the stack, and attempt to transmit the received packet on or before the local deadline.

18. A method for a router to process time-sensitive packets, the method comprising:
   receiving a time-sensitive packet comprising a stack containing at least one local deadline, the stack being comprised within a header of the time-sensitive packet;
   retrieving a local deadline from the at least one local deadline comprised within the header; and
   scheduling a transmission of the time-sensitive packet based on the local deadline;
   wherein retrieving the local deadline from the stack exposes a next deadline to be available for retrieval by a subsequent router.

* * * * *